United States Patent [19]

Soejima et al.

[11] 4,299,886
[45] Nov. 10, 1981

[54] PROCESS FOR SURFACE COATING OF MOLDED POLYCARBONATE RESIN PRODUCT

[75] Inventors: Shigeru Soejima, Shinmachi; Yasuji Ohomori, Himeji, both of Japan

[73] Assignee: Daicel Chemical Industries, Ltd., Osaka, Japan

[21] Appl. No.: 187,375

[22] Filed: Sep. 15, 1980

[30] Foreign Application Priority Data

Sep. 28, 1979 [JP] Japan .................. 54-124897

[51] Int. Cl.$^3$ .................. B32B 27/36; B05D 1/38; G02B 1/10
[52] U.S. Cl. .................. 428/412; 427/160; 427/163; 427/164; 427/387
[58] Field of Search .................. 427/160, 387, 163, 164; 428/412

[56] References Cited

U.S. PATENT DOCUMENTS

| | | | |
|---|---|---|---|
| 4,223,072 | 9/1980 | Baney et al. | 428/412 |
| 4,242,413 | 12/1980 | Iwahashi et al. | 428/412 |
| 4,243,721 | 1/1981 | Baney et al. | 428/412 |

*Primary Examiner*—James R. Hoffman
*Attorney, Agent, or Firm*—Blanchard, Flynn, Thiel, Boutell & Tanis

[57] ABSTRACT

A process for surface coating of a molded polycarbonate resin product which comprises coating and heating a primer on the surface of the molded polycarbonate resin product and then coating and hardening a coating material essentially consisting of a hydrolyzed partial condensate of an alkyltrialkoxysilane, in which the primer comprises a hydrolyzed partial condensate (A) of silane compounds comprising:

a phenyltrialkoxysilane of the general formula

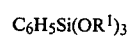 (A-1)

in which $R^1$ represents an alkyl group of $C_1$–$C_4$; and an alkyltrialkoxysilane of the general formula

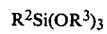 (A-2)

in which each of $R^2$ and $R^3$ represents an alkyl group of $C_1$–$C_4$, in a molar ratio of 1:0-10 (A-1:A-2).

21 Claims, No Drawings

PROCESS FOR SURFACE COATING OF MOLDED POLYCARBONATE RESIN PRODUCT

This invention relates to a process for surface coating of molded polycarbonate resin products. In particular, this invention relates to a process for surface coating which comprises coating a primer on a surface of a molded polycarbonate resin product in advance of coating a finishing coating material of a silicone resin on the surface for providing a hard surface, whereby improving adherability, abrasion resistance and resistances to hot water, outdoor exposure and solvent of the coating film with no coloring contamination.

Plastics have a variety of uses because they generally have excellent characteristics such as easy moldability, light weight, high impact resistance, easy processability and the like. However, they also have disadvantageous properties such as low hardness of surface so that the surfaces are readily scratched. Other disadvantageous properties include their solvent resistance at a low level. These properties reduce the value of the plastic products on the market.

For overcoming these disadvantageous properties, the present inventors have proposed a countermeasure including coating and hardening a hydrolyzed partial condensate of an alkyltrialkoxysilane on a surface of a molded plastic resin product; Japanese Patent Provisional Publication No. 50(1975)-143822 and Japanese Patent Publication No. 54(1979)-37828. However, the countermeasure as mentioned above has been found not to give satisfactory effect onto a polycarbonate resin. The above proposed coating material shows poor adhesion to the polycarbonate resin. Therefore, employment of a primer has been proposed for improving such poor adhesion. An example of the primer is γ-aminopropyltriethoxysilane as disclosed in Japanese Patent Provisional Publication No. 50(1975)-143822, Example 5. The heretofore proposed primers such as above, however, show poor hot water immersion resistance while show satisfactory initial adhesion. Accordingly, the adhesion of the coated film is apt to deteriorate when kept in hot water for a long time.

The present inventors have further studied primers for solving the above-stated problem and have invented a process for surface coating of a molded polycarbonate resin product which provides to the surface satisfactory characteristics such as excellent adhesion of a coated material, transparency, improved abrasion resistance, high hot water immersion resistance, improved weatherability and excellent solvent resistance.

Accordingly, the present invention resides in a process for surface coating of a molded polycarbonate resin product which comprises coating and heating a primer on a surface of the molded polycarbonate resin product and then coating and hardening a coating material essentially consisting of a hydrolyzed partial condensate of an alkyltrialkoxysilane, in which the primer comprises a hydrolyzed partial condensate (A) of silane compounds comprising:

a phenyltrialkoxysilane of the general formula $$C_6H_5Si(OR^1)_3 \quad (A\text{-}1)$$

in which $R^1$ represents an alkyl group having 1–4 carbon atoms; and
an alkyltrialkoxysilane of the general formula $$R^2Si(OR^3)_3 \quad (A\text{-}2)$$

in which each of $R^2$ and $R^3$ represents an alkyl group having 1–4 carbon atoms, in a molar ratio of 1:0–10 (A-1:A-2).

The primer of the present invention may comprise a curing catalyst (C), as well as the hydrolyzed partial condensate (A) of the above-mentioned silane compounds.

The primer of the present invention may comprise a ultraviolet absorber (E), as well as the hydrolyzed partial condensate (A) of the silane compounds and the curing catalyst (C).

An alternative embodiment of the primer of the present invention may comprise a curing catalyst (C'), an epoxy compound (D) and a ultraviolet absorber (E), as well as the hydrolyzed partial condensate (A) of the aforementioned silane compounds.

The primer of the present invention, otherwise, may comprise a solution (B) containing a carboxylic acid of the general formula $$R^4COOH$$

in which $R^4$ represents the hydrogen atom or an alkyl group having 1–5 carbon atoms, as well as the hydrolyzed partial condensate (A) of the silane compounds, the curing catalyst (C'), the epoxy compound (D) and the ultraviolet absorber (E).

The primer comprising the combination of the components (A), (B), (C'), (D) and (E) is particularly valuable in the process of the present invention, because a primer of that type is able to provide particularly excellent surface coating to a molded polycarbonate resin product showing no decrease of adhesion and giving no crack in the coated film during the weatherability test, as well as the aforementioned characteristics.

Examples of the molded polycarbonate resin product to which the process of the present invention is applied include molded products of aromatic polycarbonates such as one produced from bisphenol A and phosgene and molded products of aliphatic polycaronates such as diethylene glycol-bisallylcarbonate.

The phenyltrialkoxysilane (A-1) that is employed as the primer component of the present invention is represented by the general formula $$C_6H_5Si(OR^1)_3$$

in which $R^1$ represents a $C_1$–$C_4$ alkyl group such as methyl, ethyl, propyl or butyl. A typical representive of the phenyltrialkoxysilane is phenyltriethoxysilane.

The alkyltrialkoxysilane (A-2) that can be condensed with the phenyltrialkoxysilane (A-1) to give the condensate (A) is represented by the general formula $$R^2Si(OR^3)_3$$

in which each of $R^2$ and $R^3$ represents a $C_1$–$C_4$ alkyl group such as methyl, ethyl, propyl or butyl. A typical representative of the alkyltrialkoxysilane is methyltriethoxysilane.

The hydrolyzed partial condensate (A) employed for the primer of the present invention can be prepared from the phenyltrialkoxysilane (A-1) and the alkyltrialkoxysilane (A-2), the former (A-1) and the latter (A-1) being in a molar ratio of 1:0–10, preferably 1:0–1. Therefore, one of the preferred hydrolyzed partial condensate (A) is prepared from the phenyltrialkoxysilane (A-1) alone. The initial adhesion to the polycarbonate resin is excellent when the hydrolyzed partial condensate prepared from A-1 and A-2 in the molar ratio of 1:0-10 is employed. In view of the adhesion preservability in hot water, however, the molar ratio of 1:0-1 which means the amount of the phenyltrialkoxysilane (A-1) is more than that of the alkyltrialkoxysilane (A-2) is particularly preferred.

The hydrolyzed partial condensate (A) of the aforementioned silane compounds is a primarily hydrolyzed condensate prepared by heating the phenyltrialkoxysilane or the mixture of the phenyltrialkoxysilane and the alkyltrialkoxysilane in an aqueous solution containing a small amount of an acid for 1–10 hours, while maintaining the temperature at 50°–80° C. under reflux, as disclosed in Japanese Patent Publication No. 49(1974)-15079.

The primer solution can be prepared by, in the first place, condensing the so obtained primarily hydrolyzed condensate solution and, in the second place, dissolving the condensed product in one or more of solvents such as alcohols, e.g., methanol, ethanol, propanol and butanol, organic carboxylic acids, e.g., formic acid, acetic acid and propionic acid, ketones, e.g., methyl ethyl ketone and methyl isobutyl ketone, esters, e.g., ethyl acetate, ethyl lactate and butyl acetate, and ethers, e.g., methyl cellosolve and ethyl cellosolve. The primer solution may contain a surfactant, a ultraviolet absorber, a dye, etc., if necessary. Thus, the primer solution (A solution) is prepared.

The A solution may contain a curing catalyst (C) for the purpose of accelerating the hardening reaction of the coated film.

Examples of the curing catalysts (C) for the A solution include quaternary ammonium hydroxides such as tetraethylammonium hydroxide and trimethylbenzylammonium hydroxide, aminosilane compounds such as γ-aminopropyltriethoxysilane and N-β-(aminoethyl)-γ-aminopropyltrimethoxysilane, alkali metal salts of inorganic acids such as sodium phosphate and sodium borate, alkali metal salts of organic carboxylic acids such as sodium acetate, sodium oleate and sodium naphthenate, and organic amines and cyclic amidines and their salts such as tetrasodium salt of ethylenediaminetetraacetic acid (EDTA), triethylamine and 1,8-diazabicylo(5,4,0)undecene-7.

One of the representative embodiments of the present invention employs the primer comprising the components (A), (B), (C'), (D) and (E). A procedure for the preparation of a primer of that type is described hereinbelow.

In the first place, the epoxy compound (D) and the ultraviolet absorber (E) both are added to the aforementioned A solution to prepare ADE solution. Then, the ADE solution is mixed with the B component. The B component is a solution prepared by diluting a carboxylic acid of the general formula $R^4COOH$ (in which $R^4$ represents the hydrogen atom or an alkyl group of 1-5 carbon atoms) such as formic acid, acetic acid, propionic acid, butyric acid or valeric acid, with an organic solvent such as an alcohol, a ketone, en ester or an ether. The solution containing the (A), (B), (D) and (E) components is named ADEB solution.

The (C') component, that is, a curing catalyst, is then added to the so obtained ADEB solution, thus giving the primer solution.

In the procedure for the preparation of the primer solution, the (C') component is preferably not added to the A solution directly. The (C') component, therefore, is preferably added to a mixture of the A solution and the (B) component. The reason is that the direct addition of the (C') component to the A solution is apt to form a gel.

Particularly preferred examples of the curing catalysts (C') nclude aminosilane compounds such as γ-aminopropyltriethoxysilane and N-β-(aminoethyl)-γ-aminopropyltrimethoxysilane, and organic amines and cyclic amidines and their salts such as triethylamine and 1,8-diazabicyclo(5,4,0)undecene-7. The curing catalyst can be employed alone or in combination of two or more catalysts.

The amount of the curing catalyst to be added to the primer solution varies with the kind of the curing catalyst, but preferably is in a range of 0.05–20 weight parts based on 100 weight parts of the A component. An amount of less than 0.05 weight part gives slow hardening speed and poor adhesion, and an amount of more than 20 weight parts gives poor water resistance, while giving higher hardening speed. In the primer comprising the A through E components, the curing catalyst (C') works for curing both of the (D) and (A) components.

Examples of the epoxy compounds, that is, (D) components, include polyglycidyl ethers such as those prepared by reaction between epichlorohydrin and polyvalent phenols, e.g., bisphenol A, catechol and resorcinol, or polyvalent alcohols, e.g., (poly)ethylene glycol, glycerol, trimethylolpropane, pentaerithritol, diglycerol and solbitol, polyglycidyl ester prepared by reaction between epichlorohydrin and hexahydrophthalic acid, and cyclic epoxy resins such as including those containing an epoxy group in the cyclic group, e.g., 3,4-epoxycyclohexylmethyl-3,4-epoxycyclohexanecarboxylate. Likewise employed are alkoxysilane containing an epoxy group in the molecular structure, such as, γ-glycidoxypropyltrimethoxysilane, γ-glycidoxypropyldimethoxysilane, γ-glycidoxypropyltriethoxysilane, β-(3,4-epoxycyclohexyl)ethyltrimethoxysilane, β-(3,4-epoxycyclohexyl)ethylmethyldimethoxysilane and the like. Particularly preferred are the polyglycidylether from epichlorohydrin and bisphenol A, and the cyclic epoxy resins.

The amount of the epoxy compound, that is, (D) component, to be added to the primer solution is preferably in the range of 1–10 weight parts based on 100 weight parts of the A component, more preferably in the range of 2–10 weight parts on the same basis. An amount of more than 10 weight parts renders the adhesion of the primer to the treated base resin surface poor, and an amount of less than 1 weight part is apt to cause cracks in the coated product during the weather resistance test.

Examples of the ultraviolet absorbers, that is, (E) components, to be used in the present invention include benzophenone type absorbers such as 2,3'-dihydroxy-4,4-dimethoxybenzophenone, 2,2'-dihydroxy-4-methoxybenzophenone and 2,2',4,4'-tetrahydroxybenzophenone, and benzotriazole type absorbers such as 2-(2-hydroxy-5'-methylphenyl)benzotriazole, 2-(2'-hydroxy-5'-methylphenyl)-5,6-dichlorobenzotriazole, 2-(2-hydroxy-5'-tert.-butylphenyl)benzotriazole, 2-(2'-hydroxy-3'-methyl-5'-tert.-butylphenyl)benzotriazole, 2-(2'hydroxy-3',5'-di-tert.-butylphenyl)-5-chlorobenzotriazole, 2-(2'-hydroxy-5'-phenylphenyl)-5-chlorobenzotriazole, 2-(2'-hydroxy-3',5'-di-tert.-butylphenyl)-5-chlorobenzotriazole, 2-(2-hydroxy-5-octoxyphenyl)-benzotriazole, 2-(2'-hydroxy-3'-tert.-butyl-5'-methylphenyl)-5-chlorobenzotriazole and 2-(2-hydroxy-3-tert.-butyl-5-methylphenyl)-5,6-dichlorobenzotriazole. Particularly preferred are the benzotriazole type ultraviolet absorbers.

The amount of the ultraviolet absorber to be added to the primer may vary with the kind of the ultraviolet absorber, the kind of the silane compounds to be used, the kind of the solvent, the thickness of the coating layer to be applied, to a broad extent. Generally, the amount of the ultraviolet absorber is in the range of 0.1-5 weight parts, preferably in the range of 0.5-3 weight parts, based on 100 weight parts of the A component.

The ultraviolet absorbers described hereinabove generally have poor solubility in the alcoholic solution of the organo polysiloxane. Accordingly, the ultraviolet absorbers are preferably added in the form of solutions in organic solvents such as aromatic, ketone and ester types, to the A solution.

The solid content of the primer solution (A solution) is generally in the range of 1-40 weight %, preferably in the range of 10-30 weight %.

The primer solution can be coated on a molded polycarbonate resin product by such a method as the dipping method, the spraying method, the flow-coating method or the spin-coating method, and then the coated primer solution is heated to give a dried and hardened coated film. There is no specific limitation on the temperature for heating the coated primer solution, so far as the temperature does not exceed the heat-deformation temperature of the base material, namely, the polycarbonate resin. In general, the heating for hardening the coated film is carried out at a temperature in the range of 70°-140° C. and for 50 min. to 12 hrs. The hardening of the coated film is necessarily carried out to the extent where the primer film will not be peeled off when a final coating will be done later. Under these conditions, a satisfactory adhesion can be produced. If the hardening of the primer film exceeds the preferred level, the adhesion between the primer layer and the final coating material layer decreases. Accordingly, it is necessary to select the hardening level in the appropriate range.

The thickness of the coated primer solution layer can be selected within a broad range to meet the predetermined purpose, but the thickness preferably is in the range of 0.5-10μ.

The solid content of the primer solution containing (A), (B), (C'), (D) and (E) components (A-E solution) is generally in the range of 1-40 weight %, preferably in the range of 2-30 weight %. The value of the solid content can be adjusted by varying the amount of the solvent for the (B) component.

There is no specific limitation on the temperature for heating the coated A-E solution, so far as the temperature does not exceed the heat-deformation temperature of the base material, namely, the polycarbonate resin. In general, the heating for hardening the coated film is carried out at a temperature in the range of 60°-130° C. and for 5 min. to 12 hrs. The heating temperature is preferably selected from temperatues in the range of 110°-120° C., and the period preferably is in the range of 10 min. to 2 hrs.

The extent of the hardening and the thickness of the coated primer solution described for the A solution are also applied to the case employing the A-E solution.

The coating material, that is, final (finishing) coating material, to be employed in the present invention is one essentially consisting of a hydrolyzed partial condensate of an alkyltrialkoxysilane. The alkyltrialkoxysilane to be used in the present invention is preferably selected from those having the general formula

$$R^7Si(OR^8)_3$$

in which each of $R^7$ and $R^8$ preferably represents a $C_1$-$C_4$ alkyl group such as methyl, ethyl, propyl or butyl. A typical representative of the alkyltrialkoxysilane is methyltriethoxysilane.

The hydrolyzed partial condensate of the alkyltrialkoxysilane can be produced by heating the alkyltrialkoxysilane in an aqueous phase containing a small amount of an acid at 50°-80° C., for 1-10 hrs., as described in U.S. Pat. Nos. 3,389,114 and 3,451,838. A tetraalkoxysilane can be added to the alkyltrialkoxysilane to subject to the partial cohydrolysis for improving the hardness of the coated film. Alternatively, the hydrolyzed partial condensate of the tetraalkoxysilane can be mixed with the hydrolyzed partial condensate of the alkyltrialkoxysilane to imcorporate in the coating material.

The coating material can be prepared by condensing the so obtained hydrolyzed partial condensate of the alkyltrialkoxysilane or the mixture of the condensates, and dissolving the condensed product in one or more of solvents such as alcohols, e.g., methanol, ethanol, propanol and butanol, carboxylic acids, e.g., formic acid, acetic acid and propionic acid, ketones, e.g., methyl ethyl ketone and methyl isobutyl ketone, esters, e.g., ethyl acetate, ethyl lactate and butyl acetate, and ethers, e.g., methyl cellosolve and ethyl cellosolve. To the so prepared coating material are further added a curing catalyst, a surfactant, etc. If necessary, other additives such as a ultraviolet absorber and a dye can be incorporated in the coating material.

Examples of the curing catalysts which are added to accelerate the hardening reaction of the coated film include quaternary ammonium hydroxides such as tetraethylammonium hydroxide and trimethylbenzylammonium hydroxide, alkali metal salts of inorganic acids such as sodium phosphate and sodium borate, alkali metal salts of organic carboxylic acids such as sodium acetate, sodium oleate and sodium naphthenate, and organic amines and cyclic amidines and their salts such as tetrasodium salt of ethylenediaminetetraacetic acid (EDTA), triethylamine and 1,8-diazabicylo(5,4,0)undecene-7.

The solid content of the final coating material is generally in the range of 1-40 weight %, preferably in the range of 10-30 weight %.

The final coating material prepared as above can be coated on the primer-coated molded polycarbonate resin product by such a method as the immersing method, the spraying method, the flow-coating method or the spin-coating method, and then the so coated final coating solution is heated to give a dried and hardened final coated film. Thus, the process of the present invention is completed.

The thickness of the coated final coating material layer can be selected to meet the predetermined purpose of the coated product, but the thickness generally is in the range of 1-20μ.

The conditions for the heat-hardening procedure are generally selected from temperatures in the range of 50°-140° C. and periods in the range of 15 min. to 12 hrs.

Preferred are a temperature of 80°–130° C. and a period of 2–3 hrs.

The molded polycarbonate resin products coated by applying the process of the present invention are prominently excellent in the adhesion of the coated film, abrasion resistance, hot water immersion resistance, weatherability, and solvent resistance.

Accordingly, the process of the present invention can be advantageously applied to window glasses of an automotive, an electric car and an airplane, window glasses of a building, goggles for skiing, lens for sun glasses, lens of protective glasses, opthalmic lens, lens of optical devices, etc., so as to protect such products from getting scratched.

The present invention is now further illustrated by the following non-limiting examples.

EXAMPLE 1

In a reactor equipped with a reflux condenser, 720 g. (3 moles) of phenyltriethoxysilane, 162 g. (9 moles) of water and 1 cc. of 0.1 N hydrochloric acid were placed and mixed well. The mixture was then heated under reflux for 4 hrs. As the reaction progressed, the initially heterogeneous phase turned homogeneous.

The solution was concentrated by evaporation of the ethanol to obtain a solid hydrolyzed partial condensate of phenyltriethoxysilane.

In 50 parts (by weight; the same hereinafter) of ethanol were dissolved 30 parts of the so obtained solid hydrolyzed partial condensate of phenyltriethoxysilane. To the solution were added 20 parts of acetic acid and 5 parts of γ-aminopropyltriethoxysilane (curing catalyst), and these were well mixed to prepare a primer solution. This primer solution showed the viscosity of 7 cP (centipoise) at 20° C. on the measurement using the Brookfield viscometer.

A final (finish) coating material was prepared as follows. 356 g. (2 moles) of methyltriethoxysilane, 108 g. (6 moles) of water and 1 cc. of 0.1 N hydrochloric acid were well mixed and heated under reflux for 4 hrs. The so produced ethanol was removed by evaporation to obtain a hydrolyzed partial condensate of methyltriethoxysilane. Thirty parts (by weight; the same hereinafter) of the so obtained hydrolyzed partial condensate of methyltriethoxysilane, 50 parts of ethanol (industrial grade), 20 parts of acetic acid, 3 parts of aqueous tetraethylammonium hydroxide solution (10%) and 0.5 part of a surfactant were well mixed to prepare a final coating material.

In the primer solution obtained previously was dipped a polycarbonate resin sheet (100×100×2 mm.) that had been washed and dried in advance. The dipped sheet was then taken out of the solution at the rate of 20 cm./min. with no vibrating action. The so treated sheet was immediately introduced into a hot-air oven and heated at 70° C. for one hr. Then, the heating was continued at 90° C. for 5 hrs.

The sheet thus coated with a primer was dipped in the final coating material, and then taken out of the coating solution at the rate of 20 cm./min. with no vibrating action. The so treated sheet was again immediately introduced into a hot-air oven and heated at 90° C. for 5 hrs. to obtain a polycarbonate sheet having the hardened surface film.

The coated sheet was evaluated in the following manners.

(1) Measurement of Abrasion Resistance Property

The surface of the coated sheet was given abrasion in Taber Abrasion Testing Device (prepared by Yasuda Seiki, Japan) under the conditions of 500 g. of the load and 100 cycles using the wheel of CS-10F. The coated film was then subjected to the Haze Meter (prepared by Suga Testing Machine K.K., Japan) to measure the total light transmittance and the light scattering. The abrasion resistance property is expressed by the value of the haze calculated according to the following equation.

$$\text{Haze (\%)} = \frac{\text{Light Scattering}}{\text{Total Light Transmittance}} \times 100$$

(2) Initial Adhesive Property

A sheet to be tested was fixed on the Cross Cut Testing Machine (manufactured by Toyo Seiki Corp., Japan), and the sheet was given eleven cut lines at intervals both lengthwise and breadthwise by means of a single-edged razor under the load of 200 g. A regenerated cellulose adhesive tape was adhered against the crosshatching, and then the tape was strongly pulled in the vertical direction out of the sheet. The exfoliation of the coated film was then observed.

The initial adhesive property is expressed by number of the remaining squares against 100 of the crosshatched square (numerator/denominator).

(3) Hot Water Immersion Resistance

The coated sheet was immersed in hot water maintained at 100° or 60° C., and the so treated sheet was then subjected to the initial adhesive property test described above.

The result is expressed by the time at which the adhesion began to reduce.

(4) Weatherability

The coated sheet was exposed to the sun-shine type Weather-O meter and the so exposed sheet was then subjected to the initial adhesive property test described above.

The result is expressed by the period of time of the exposure at which the adhesion began to reduce. The period of time of the exposure at which craze began to appear in the coating film of the sheet was also taken, and is expressed in the term of "appearance".

(5) Solvent Resistance

On the coated sheet was placed acetone in such amount and manner that the acetone did not flow over, and then the appearance of the coated film was observed. The solvent resistance is expressed by the period of time at which the coated film began to show swelling or separation. If the amount of the acetone reduced by spontaneous evaporation during the period of observation, acetone was added to continue the observation.

The results given in the tests (1) through (5) are set forth in Table 1.

EXAMPLE 2

The procedures described in Example 1 were repeated except that 720 g. (3 moles) of the phenyltriethoxysilane was replaced with 480 g. (2 moles) of phenyltriethoxysilane and 178 g. (1 mole) of methyltriethoxysilane.

The results are set forth in Table 1.

EXAMPLE 3

The procedures described in Example 1 were repeated except that 720 g. (3 moles) of the phenyltriethoxysilane was replaced with 240 g. (1 mole) of phenyltriethoxysilane and 356 g. (2 moles) of methyltriethoxysilane.

The results are set forth in Table 1.

Comparative Example 1

The polycarbonate sheet described in Example was as such subjected to the tests, with no coating.

The results are set forth in Table 1.

Comparative Example 2

The polycarbonate sheet described in Example 1 was coated with the final coating material in the absence of the primer layer, and then subjected to the tests.

The results are set forth in Table 1.

Comparative Example 3

The procedures described in Example 1 were repeated except that the primer was replaced with γ-aminopropyltriethoxysilane.

The results are set forth in Table 1.

EXAMPLE 4

The procedures described in Example 1 were repeated except that the polycarbonate sheet was replaced with a sheet which has been prepared from diethylene glycol bisallylcarbonate through the cast-molding and except that the primer employed in Example 2 was used and hardened at 90° C. for 3 hrs.

The results are set forth in Table 1.

EXAMPLE 5

The procedures described in Example 1 were repeated except that 720 g. (3 moles) of phenyltriethoxysilane was replaced with 576 g. (2.4 moles) of phenylethoxysilane and 107 g. (0.6 mole) of methyltriethoxysilane. Thus, a polycarbonate sheet with coating film on the surface was prepared.

The results are set forth in Table 1.

As seen from the results in Table 1, the coated sheet prepared in Examples 1 through 5 were more excellent in the initial adhesion, abrasion resistance, hot water immersion resistance, weatherability and solvent resistance, as compared with the sheets prepared in Comparative Examples 1 through 3.

EXAMPLE 6

In a reactor equipped with a reflux condenser, 720 g. (3 moles) of phenyltriethoxysilane, 160 g. (9 moles) of water and 1 cc. of 0.1 N hydrochloric acid were placed and mixed well. The mixture was then heated under reflux for 4 hrs. As the reaction progressed, the initially heterogeneous phase turned homogeneous.

The solution was concentrated by evaporation of the produced ethanol to obtain a solid hydrolyzed partial condensate of phenyltriethoxysilane.

In 300 parts (by weight; the same hereinafter) of n-butanol were dissolved 100 parts of the so obtained solid hydrolyzed partial condensate of phenyltriethoxysilane, 6 parts of Epikote 828 (trade name of bisphenol A polyglycidyl ether; available from Shell Chemical Corp.), and 1 parts of Tinuvin 327 (trade name of a ultraviolet absorber of benzotriazole type; available from Ciba-Geigy Corp.). To the solution were added 30 parts of acetic acid. To the resulting solution were added under stirring and cooling to a temperature lower than 20° C., 16 parts of γ-aminopropyltriethoxysilane slowly. To this were further added 7 parts of water, and the mixture was then mixed well to prepare a primer solution.

TABLE 1

| Example No. | Primer Component A | Initial Adhesive Property | abrasion resistance | Hot Water Immersion Resistance 100° C. (hrs.) more than | Hot Water Immersion Resistance 60° C. (days) more than | Weatherability (hrs.) Adhesion | Weatherability (hrs.) Appearance | Solvent Resistance (min.) |
|---|---|---|---|---|---|---|---|---|
| 1 | Phenyltriethoxysilane | 100/100 | 1.5 | 72 | 10 | 400 | 250 | 15 |
| 2 | Phenyltriethoxysilane / Methyltriethoxysilane = 2/1 | 100/100 | 1.2 | 72 | 10 | 400 | 250 | 15 |
| 3 | Phenyltriethoxysilane / Methyltriethoxysilane = 1/2 | 100/100 | 1.7 | 10 | 3 | 250 | 150 | 15 |
| 4 | Phenyltriethoxysilane / Methyltriethoxysilane = 2/1 | 100/100 | 1.5 | 72 | 10 | 400 | 250 | 15 |
| 5 | Phenyltriethoxysilane / Methyltriethoxysilane = 4/1 | 100/100 | 1.5 | 72 | 10 | 400 | 250 | 15 |
| Comparative Example No. 1 | None (no coating was given) | — | 35 | — | — | — | — | — |
| 2 | No-primer was used (final coating only) | 0/100 | 15 | — | — | — | — | 2 |
| 3 | γ-Aminopropyltriethoxysilane | 100/100 | 1.9 | 1 | 1 | 100 | — | 5 |

This primer solution showed the viscosity of 10 cP at 20° C. on the measurement using the Brookfield viscometer.

A final coating material was prepared in the same manner as described in Example 1.

A polycarbonate resin sheet (100×100×2 mm.) was processed in the same manner as described in Example 1 to prepare the sheet coated with both of the so obtained primer and final coating material. In the procedures, the condition for heating the primer-coated sheet to dry was chosen to be 120° C. for 1 hr.

The coated sheet was evaluated in the same manner as described in Example 1.

The results given in the evaluation tests are set forth in Table 2.

EXAMPLE 7

The procedures described in Example 6 were repeated except that 720 g. (3 moles) of the phenyltriethoxysilane was replaced with 960 g. (4 moles) of phenyltriethoxysilane and 178 g. (1 mole) of methyltriethoxysilane.

The results are set forth in Table 2.

EXAMPLE 8

The procedures described in Example 6 were repeated except that 720 g. (3 moles) of the phenyltriethoxysilane was replaced with 240 g. (1 mole) of phenyltriethoxysilane and 356 g. (2 moles) of methyltriethoxysilane.

The results are set forth in Table 2.

EXAMPLE 9

The procedures described in Example 7 were repeated except that the Epikote 828 (trade name of bisphenol A polyglycidyl ether; available from Shell Chemical Corp.) was used in the amount of 6 parts in place of 3 parts.

The results are set forth in Table 2.

EXAMPLE 10

The procedures described in Example 7 were repeated except that the γ-aminopropyltriethoxysilane was replaced with N-β-(aminoethyl)-γ-aminopropyltrimethoxysilane.

The results are set forth in Table 2.

EXAMPLE 11

The procedures described in Example 7 were repeated except that the γ-aminopropyltriethoxysilane was replaced with 0.3 part of 1,8-diazabicylo(5,4,0)undecene-7.

The results are set forth in Table 2.

EXAMPLE 12

The procedures described in Example 7 were repeated except that the Epikote 828 (trade name of bisphenol A polyglycidyl ether; available from Shell Chemical Corp.) was replaced with 6 parts of γ-glycidoxypropyltrimethoxysilane.

The results are set forth in Table 2.

EXAMPLE 13

The procedures described in Example 7 were repeated except that the Tinuvin 327 (trade name of a ultraviolet absorber of benzotriazole type; available from Ciba-Geigy Corp.) was replaced was Tinuvin P (trade name of a ultraviolet absorber of benzotriazole type; available from Ciba-Geigy Corp.).

The results are set forth in Table 2.

EXAMPLE 14

The procedures described in Example 9 were repeated except that the polycarbonate sheet was replaced with a polydiethylene glycol.

The results are set forth in Table 2.

Comparative Example 4

The procedures described in Example 6 were repeated except that the Epikote 828 (trade name of bisphenol A polyglycidyl ether; available from Shell Chemical corp.) was used in the amount of 20 parts in place of 6 parts.

TABLE 2

| | Initial Adhesive Property | Abrasion resistance | Hot Water Immersion Resistance | | Weatherability (hrs.) | | Solvent Resistance (min.) more than |
|---|---|---|---|---|---|---|---|
| | | | 100° C. (hrs.) more than | 60° C. (days) more than | Adhesion | Appearance | |
| Example No. | | | | | | | |
| 6 | 100/100 | 1.5 | 72 | 10 | 1,500 | 1,000 | 15 |
| 7 | " | 1.2 | 72 | 10 | 1,200 | 1,300 | " |
| 8 | " | 1.7 | 10 | 3 | 600 | 500 | " |
| 9 | " | 1.5 | 72 | 10 | 1,000 | 1,100 | " |
| 10 | " | 1.5 | 10 | 3 | 600 | 500 | " |
| 11 | " | 1.7 | 72 | 10 | 800 | 700 | " |
| 12 | " | 1.5 | 72 | 10 | 1,000 | 800 | " |
| 13 | " | 1.5 | 72 | 10 | 800 | 700 | " |
| 14 | " | 1.5 | 72 | 10 | 2,000 | 2,000 | " |
| Comparative Ex. No. | | | | | | | |
| 4 | 0/100 | 1.8 | | | | | 5 |

Remark: The compositions of the primers employed in the examples and comparative examples are as follows:

In the following, PS means phenyltriethoxysilane, and MS means methyltriethoxysilane.

| | A | B | C | D |
|---|---|---|---|---|
| Ex. No. | | | | |
| 6 | PS | γ-Aminopropyltriethoxysilane 16 parts | Epikote 828 6 parts | Tinuvin 327 1 part |
| 7 | PS/MS = 4/1 | γ-Aminopropyltriethoxysilane 16 parts | Epikote 828 6 parts | Tinuvin 327 1 part |
| 8 | PS/MS = ½ | γ-Aminopropyltriethoxysilane 16 parts | Epikote 828 6 parts | Tinuvin 327 1 part |
| 9 | PS/MS = 4/1 | γ-Aminopropyltriethoxysilane 16 parts | Epikote 828 3 parts | Tinuvin 327 1 part |
| 10 | " | N-β-(aminoethyl)-γ-aminopropyltrimethoxysilane 16 parts | Epikote 828 6 parts | Tinuvin 327 1 part |
| 11 | " | 1,8-Diazabicyclo(5,4,0)-undecene-7 0.3 part | Epikote 828 6 parts | Tinuvin 327 1 part |
| 12 | " | γ-Aminopropyltriethoxysilane 16 parts | γ-Glycidoxypropyltrimethoxysilane | Tinuvin 327 1 part |

-continued

| | A | B | C | D |
|---|---|---|---|---|
| 13 | " | γ-Aminopropyl-triethoxysilane 16 parts | 6 parts Epikote 828 6 parts | Tinuvin P 1 part |
| 14 | " | γ-Aminopropyl-triethoxysilane 16 parts | Epikote 828 6 parts | Tinuvin 327 1 part |
| Com-Ex.No. | | | | |
| 4 | " | γ-Aminopropyl-triethoxysilane 16 parts | Epikote 828 20 parts | Tinuvin 327 1 part |

EXAMPLE 15

The procedures described in Example 1 were repeated except that the primer solution further contained 1 part of Tinuvin 327. The so coated polycarbonate sheet was examined on the weatherability.

The results are set forth in Table 3.

EXAMPLE 16

The procedures described in Example 5 were repeated except that the primer solution further contained 1 part of Tinuvin 327. The so coated polycarbonate sheet was examined on the weatherability.

The results are set forth in Table 3.

TABLE 3

| | Weatherability (hrs.) | |
|---|---|---|
| | Adhesion | Appearance |
| Example 15 | 700 | 250 |
| Example 16 | 700 | 250 |

The embodiments of the invention in which all exclusive property or priviledge is claimed are defined as follows:

1. A process for surface coating of a molded polycarbonate resin product which comprises coating and heating a primer on the surface of the molded polycarbonate resin product and then coating and hardening a coating material essentially consisting of a hydrolyzed partial condensate of an alkyltrialkoxysilane, in which the primer comprises a hydrolyzed partial condensate (A) of silane compounds comprising:
a phenyltrialkoxysilane of the general formula $$C_6H_5Si(OR^1)_3 \qquad (A\text{-}1)$$

in which $R^1$ represents an alkyl group of $C_1$–$C_4$; and an alkyltrialkoxysilane of the general formula $$R^2Si(OR^3)_3 \qquad (A\text{-}2)$$

in which each of $R^2$ and $R^3$ represents an alkyl group of $C_1$–$C_4$,
in the molar ratio of 1:0–10, being the former : the latter ratio.

2. A process as claimed in claim 1, in which the molar ratio between the phenyltrialkoxysilane and the alkyltrialkoxysilane is 1:0–1.

3. A process as claimed in claim 1, in which the hydrolyzed partial condensate (A) is one prepared from the phenyltrialkoxysilane (A-1).

4. A process as claimed in claim 1, in which the primer solution further comprises a curing catalyst.

5. A process as claimed in claim 4, in which the primer solution further comprises a ultraviolet absorber.

6. A process as claimed in claim 1, in which the phenyltrialkoxysilane is phenyltriethoxysilane.

7. A process as claimed in claim 1, in which the alkyltrialkoxysilane is methyltriethoxysilane.

8. A process for surface coating of a molded polycarbonate resin product which comprises coating and heating a primer on the surface of the molded polycarbonate resin product and then coating and hardening a coating material essentially consisting of a hydrolyzed partial condensate of an alkyltrialkoxysilane, in which the primer comprises:
a hydrolyzed partial condensate (A) of silane compounds comprising a phenyltrialkoxysilane of the general formula $$C_6H_5Si(OR^3)_3 \qquad (A\text{-}1)$$

in which $R^1$ represents an alkyl group of $C_1$–$C_4$, and an alkyltrialkoxysilane of the general formula
$$R^2Si(OR^3)_3 \qquad (A\text{-}2)$$

in which each of $R^2$ and $R^3$ represents an alkyl group of $C_1$–$C_4$
in the molar ratio of 1:0–10, being the former:the latter ratio;
a curing catalyst;
an epoxy compound; and
a ultraviolet absorber.

9. A process as claimed in claim 8, in which the primer further comprises a solution containing a carboxylic acid of the general formula $$R^4COOH$$

in which $R^4$ represents the hydrogen atom or an alkyl group of $C_1$–$C_5$.

10. A process as claimed in claim 8, in which the curing catalyst is selected from the group consisting of γ-aminopropyltriethoxysilane, N-β-(aminoethyl)-γ-aminopropyltrimethoxysilane, triethylamine and 1,8-diazabicyclo(5,4,0)undecene-7.

11. A process as claimed in claim 8, in which the curing catalyst is added in the amount of 0.05–20 weight parts to 100 weight parts of the hydrolyzed partial condensate (A) of the silane compounds.

12. A process as claimed in claim 8, in which the epoxy compound is a polyglycidylether prepared from epichlorohydrin and bisphenol A, or a cyclic epoxy resin.

13. A process as claimed in claim 8, in which the epoxy compound is added in the amount of 2–10 weight parts to 100 weight parts of the hydrolyzed partial condensate (A) of the silane compounds.

14. A process as claimed in claim 8, in which the ultraviolet absorber is selected from benzotriazole ultraviolet absorbers.

15. A process as claimed in claim 8, in which the ultraviolet absorber is added in the amount of 0.5–3 weight parts to 100 weight parts of the hydrolyzed partial condensate (A) of the silane compounds.

16. A process as claimed in claim 8, in which the molar ratio between the phenyltrialkoxysilane and the alkyltrialkoxysilane is 1:0–1.

17. A process as claimed in claim 8, in which the hydrolyzed partial condensate (A) is one prepared from the phenyltrialkoxysilane (A-1).

18. A process as claimed in claim 8, in which the content of the solid portion in the primer solution ranges form 2 to 30 weight %.

19. A process as claimed in claim 8, in which the primer is heated at 110°–120° C. for 10 min. to 2 hrs.

20. A process as claimed in claim 8, in which thickness of the primer coated on the surface of the molded polycarbonate resin product ranges from 0.5–10μ.

21. A molded polycarbonate resin product coated by applying the process as claimed in claim 1 or 8.

* * * * *